United States Patent
La Forest et al.

(10) Patent No.: US 7,938,992 B2
(45) Date of Patent: May 10, 2011

(54) CVI FOLLOWED BY COAL TAR PITCH DENSIFICATION BY VPI

(75) Inventors: Mark L. La Forest, Granger, IN (US); Neil Murdie, Granger, IN (US); Allen H. Simpson, Buchanan, MI (US)

(73) Assignee: Honeywell International Inc., Morristown, NJ (US)

( * ) Notice: Subject to any disclaimer, the term of this patent is extended or adjusted under 35 U.S.C. 154(b) by 65 days.

(21) Appl. No.: 12/036,881

(22) Filed: Feb. 25, 2008

(65) Prior Publication Data

US 2009/0214781 A1 Aug. 27, 2009

(51) Int. Cl.
*C01B 31/00* (2006.01)
(52) U.S. Cl. ............ 264/29.5; 264/103; 264/171.1
(58) Field of Classification Search ............ 264/29.5, 264/103, 171.1
See application file for complete search history.

(56) References Cited

U.S. PATENT DOCUMENTS

| | | | |
|---|---|---|---|
| 5,654,059 A | 8/1997 | Hecht | |
| 5,770,127 A | 6/1998 | Abrams et al. | |
| 5,837,081 A | 11/1998 | Ting et al. | |
| 6,323,160 B1 | 11/2001 | Murdie et al. | |
| 6,325,608 B1 | 12/2001 | Shivakumar et al. | |
| 6,342,171 B1 | 1/2002 | Murdie et al. | |
| 6,537,470 B1 | 3/2003 | Wood et al. | |
| 6,939,490 B2 | 9/2005 | La Forest et al. | |
| 7,063,870 B2 | 6/2006 | La Forest et al. | |
| 7,172,408 B2 | 2/2007 | Wood et al. | |
| 7,234,571 B2 | 6/2007 | Wood et al. | |
| 7,252,499 B2 | 8/2007 | LaForest et al. | |
| 2003/0111752 A1 | 6/2003 | Wood et al. | |
| 2003/0214064 A1 | 11/2003 | Shin et al. | |
| 2005/0093188 A1 | 5/2005 | Forest et al. | |
| 2006/0151912 A1 | 7/2006 | Bauer | |
| 2006/0177663 A1 | 8/2006 | Simpson et al. | |

(Continued)

FOREIGN PATENT DOCUMENTS

EP 1 724 245 A1 8/2006

(Continued)

OTHER PUBLICATIONS

Extended European Search Report from corresponding EP Application No. 09152412.4, mailed Apr. 6, 2009, 10 pages.

(Continued)

*Primary Examiner* — Christina Johnson
*Assistant Examiner* — Larry Thrower
(74) *Attorney, Agent, or Firm* — Shumaker & Sieffert, P.A.

(57) ABSTRACT

Method for manufacturing pitch-densified carbon-carbon composite brake discs from carbon fiber preforms, by the following sequential steps: (a) providing a carbon-carbon composite brake disc preform; (b) heat treating the preform; (c) subjecting the heat-treated preform to Chemical Vapor Deposition/Chemical Vapor Infiltration processing; (d) infiltrating the preform with an isotropic low to medium char-yield pitch by Vacuum Pitch Infiltration processing or Resin Transfer Molding processing; (e) carbonizing the pitch-infiltrated preform; (f) machining the surfaces of the resulting carbonized preform; and (g) repeating steps (d) through (f) until the density of the carbon-carbon composite preform is at least 1.70 g/cc. The use of VPI equipment with isotropic, low to medium char-yield pitches for all densification steps following an initial CVD densification reduces capital and pitch materials cost. However, one or more RTM processing steps employing low to medium char-yield pitches may also be used to obtain improved economics.

6 Claims, 2 Drawing Sheets

U.S. PATENT DOCUMENTS

| | | |
|---|---|---|
| 2006/0197244 A1 | 9/2006 | Simpson et al. |
| 2006/0244165 A1 | 11/2006 | Huang |
| 2006/0261504 A1* | 11/2006 | Simpson et al. ............. 264/29.1 |
| 2006/0279012 A1 | 12/2006 | Simpson et al. |
| 2009/0194895 A1 | 8/2009 | La Forest et al. |

FOREIGN PATENT DOCUMENTS

| | | |
|---|---|---|
| EP | 1731292 A2 | 12/2006 |
| WO | WO-98/27023 A1 | 6/1998 |
| WO | WO-02/18120 A2 | 3/2002 |
| WO | WO-2005/116476 A2 | 12/2005 |
| WO | WO-2006/086167 A1 | 8/2006 |
| WO | 2006/115755 A2 | 11/2006 |

OTHER PUBLICATIONS

Examination Report from corresponding EP Application No. 09152412.4, mailed Jun. 11, 2010, 4 pages.

H.O. Pierson et al, "The Chemical Vapor Deposition of Carbon on Carbon Fibers," Carbon, 1973, vol. 13, pp. 159-166, Pergamon Press.

Oh et al., "Effects of Matrix Structure on Mechanical Properties of Carbon/Carbon Composites," Carbon, vol. 26, No. 6, pp. 769-776, 1988.

U.S. Appl. No. 12/027,120, filed Feb. 6, 2008, titled "Method for Reducing Variability in Friction Performance".

* cited by examiner

CVI FOLLOWED BY COAL TAR PITCH DENSIFICATION BY VPI

FIELD OF THE INVENTION

This invention relates to the manufacture of carbon-carbon composite brake discs from carbon fiber preforms which are densified with pitch.

BACKGROUND OF THE INVENTION

Chemical Vapor Deposition/Chemical Vapor Infiltration (CVD/CVI) processing entails a high capital investment cost. Combining Resin Transfer Molding (RTM) processing of mesophase or other high char-yield pitches with CVD/CVI processing further increases capital costs. RTM processing also entails significant raw material costs, due to the expensive nature of the high char-yield pitches typically used in RTM processing.

U.S. Pat. No. 5,837,081 (Ting et al.) discloses a method for making a carbon-carbon composite that includes densification of the preform using pitch infiltration which may also include a combination of CVD with pitch infiltration. See e.g. lines 55-65 in column 4 of the Ting et al. patent.

U.S. Pat. No. 6,323,160 B1 (Murdie et al.) discloses a carbon-carbon composite made from densified carbon foam which includes CVD/CVI processing and VPI pitch infiltration.

US 2006/0244165 A1 (Huang) discloses manufacturing carbon fiber reinforced ceramics as brake discs. The Huang process involves densification steps including CVD/CVI as well as pitch infiltration in which the preform is placed into a vacuum chamber with pitch introduced into the chamber (i.e., VPI).

SUMMARY OF THE INVENTION

This invention utilizes a precise sequence of process steps to reduce the capital and material costs that are associated with pitch densification of mesophase (high char-yield) pitches into carbon-carbon composites by RTM as well as with densification that employs only CVD/CVI. More specifically, the present invention employs Vacuum Pitch Infiltration (VPI) and/or RTM processing to densify the carbon-carbon composites with isotropic (low to medium char-yield) pitches obtained from coal tar, petroleum, or synthetic feedstocks. VPI processing entails lower capital costs than does CVD/CVI processing or RTM. Moreover, the use of the low cost ($0.20-$0.50/lb) isotropic, low to medium char-yield pitches derived from coal tar, petroleum, or synthetic feedstocks instead of the more expensive mesophase pitches ($5.00-$10.00/lb) that are typically used for RTM processing helps to significantly reduce the cost of the final product.

A preferred embodiment of this invention, in terms of reduced capital and pitch materials cost, will include the use of VPI equipment with isotropic (low to medium char-yield) pitches for all densification steps following an initial CVD densification. However, one or more RTM processing steps employing low to medium char-yield pitches may also be used to obtain improved economics.

Starting with a previously prepared nonwoven or random fiber-based carbon-carbon composite in the shape of a brake disc, this invention employs the following sequential steps:
(b) heat treating the carbon fiber preform at 1600-2540° C.;
(c) subjecting the preform to a single cycle of CVD/CVI processing to impart to the preform a density of about 1.1 g/cc to 1.4 g/cc;
(d) infiltrating the preform with an isotropic low to medium char-yield pitch (coal tar-derived, petroleum-derived, or synthetic-derived) employing VPI or RTM processing, to impart to the preform a density of about 1.3 g/cc to 1.6 g/cc;
(e1) optionally stabilizing the pitch-infiltrated preform by heating it in air at about 180° C.;
(e2) carbonizing the pitch-infiltrated preform at 900-2400° C., e.g. with a 4 hour hold to ensure uniform temperature in the furnace, thereby converting the isotropic pitch to anisotropic graphitic/graphitizable carbon;
(e3) optionally heat treating the carbonized preform at 1600-2400° C., with a 4 hour hold, to further graphitize the pitch matrix;
(f) machining the surfaces of the carbonized pitch-infiltrated preform; and
(g) repeating steps (d) through (g) until the density of the preform is at least 1.70 g/cc.

BRIEF DESCRIPTION OF THE DRAWINGS

These and other aspects and features of the invention will be better understood after a reading and understanding of the below detailed description together with the following drawings wherein.

DETAILED DESCRIPTION OF THE INVENTION

Figure 1:
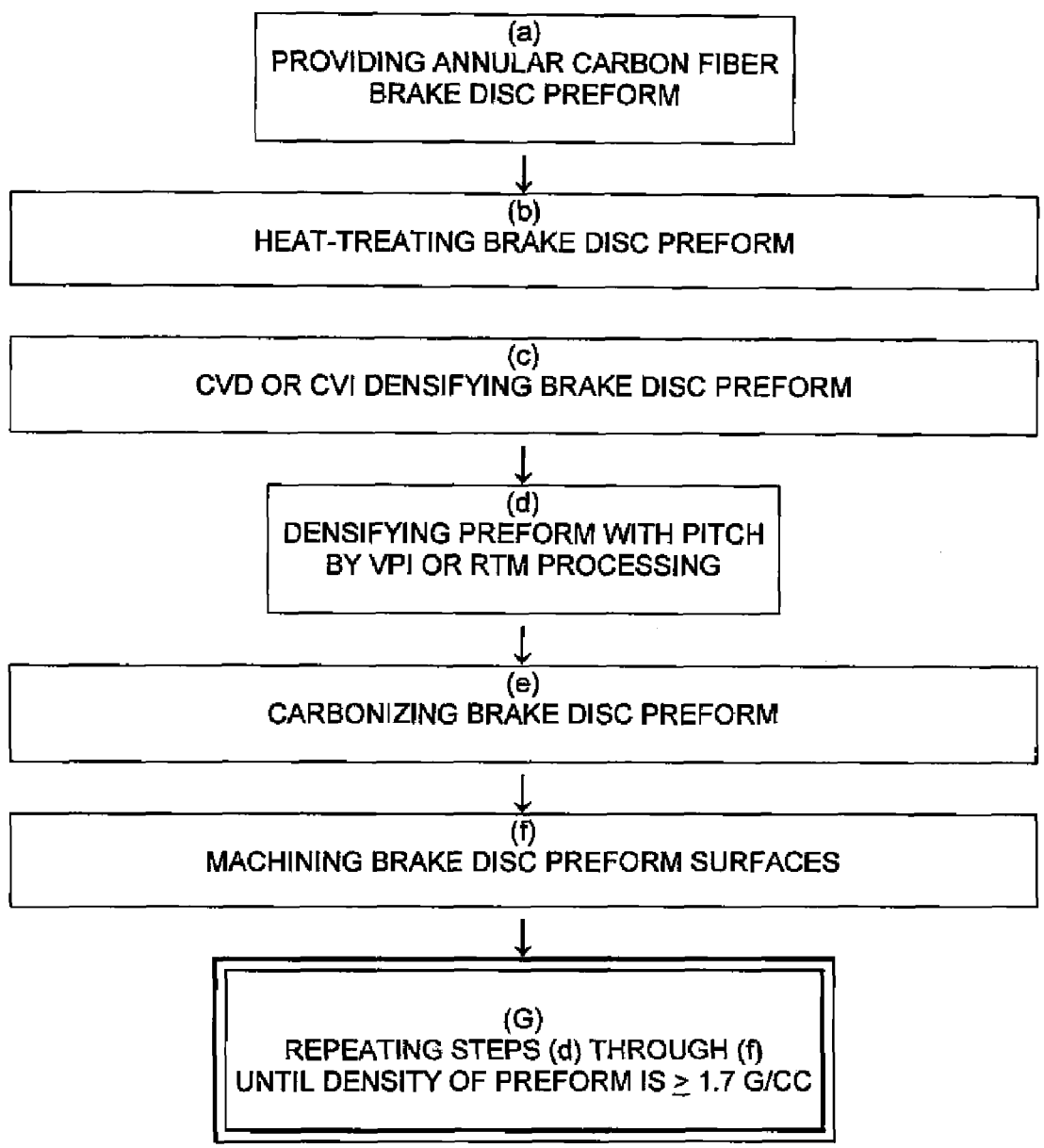
FIG. 1 is a flowchart depicting steps in the process of the present invention.
Figure 2:
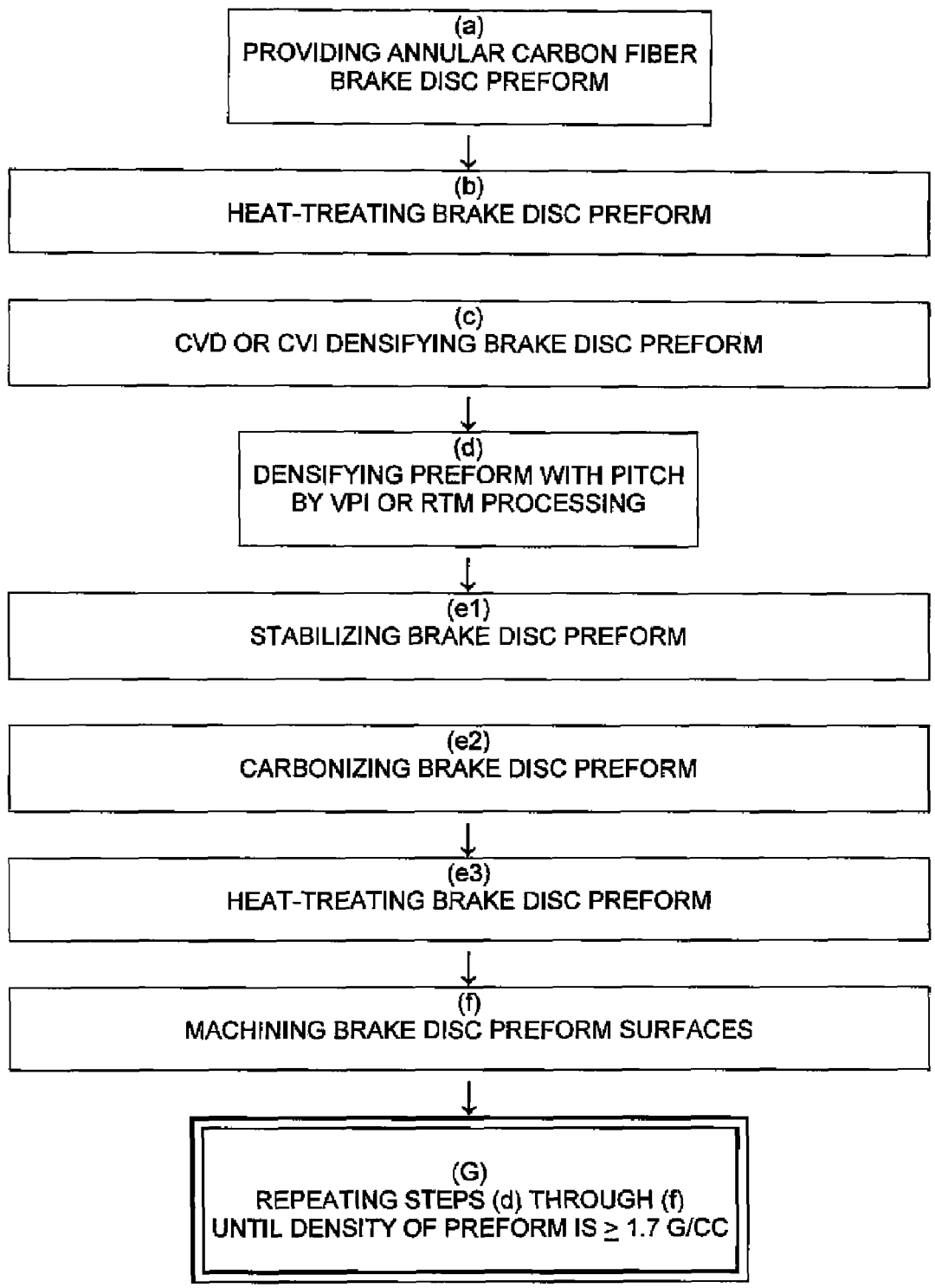
FIG. 2 is a flowchart depicting steps in the process of the present invention, including an optional stabilization step and an optional heat treatment step.

The present invention makes use of processing modules which are known in themselves. The advantages provided by the present invention lie in the selection and ordering of known processing modules to improve uniformity in the microstructure of the composite brake discs prepared in accordance with this invention.

In one embodiment, this invention provides a method for the manufacture of pitch-densified carbon-carbon composite brake discs from carbon fiber preforms by way of the sequential steps (a) through (g) described below.

Step (a) involves providing a carbon-carbon composite preform in the shape of a brake disc to be manufactured. Step (b) involves heat treating that preform at 1600-2540° C. Step (c) involves subjecting the heat-treated preform to CVD/CVI processing. The carbonized fiber preform produced in CVD/CVI densification step (c) may: (i.) have a rough laminar microstructure and be densified (e.g., at a temperature of 1275° C., a pressure of 210 Torr, and a C/H ratio of 1/4) to a density of about 1.4 grams per cubic centimeter; (ii.) have a smooth laminar microstructure and be densified (e.g., at a temperature of 1200° C., a pressure of 630 Torr, and a C/H ratio of 1/4) to a density of about 1.2 grams per cubic centimeter; or (iii.) have an isotropic microstructure and be densified (e.g., at a temperature of 1425° C., a pressure of 630 Torr, and a C/H ratio of 1/4) to a density of about 1.1 grams per cubic centimeter.

Step (d) involves infiltrating the preform with an isotropic low to medium char-yield pitch, employing Vacuum Pitch Infiltration processing or Resin Transfer Molding processing. Those processing techniques are well known in general. They are described in more detail hereinbelow. The isotropic pitch used in step (d) will normally be a low cost, low to medium char-yield material derived from coal tar, petroleum, or synthetic feedstock.

Step (e) involves carbonizing the pitch-infiltrated preform at 900-2400° C. In preferred embodiments, carbonization may be carried out at a temperature between about 1200 and 2000° C. in an inert nitrogen atmosphere or in a vacuum. Step (e) may optionally be directly preceding by a step comprising stabilizing the pitch-infiltrated preform by heating it in air at a temperature between about 150 and 250° C. (conveniently, for instance, at about 180° C.) to prevent pitch exudation. Instead of this stabilization step, pressure and a can may be used to prevent and contain any pitch exudation during heat treatment. Step (e) may optionally be directly followed by a step comprising heat treating the carbonized preform at 1600-2400° C., with a 4 hour hold, to further graphitize the pitch matrix. All, both, or none of these optional steps may be employed in accordance with various embodiments of the present invention.

Step (f) involves machining the surfaces of the carbonized preform resulting from the preceding steps. The purpose of intermediate machining between densification processing steps is to grind down the surfaces of the annular discs in order to expose porosity in the surfaces of the discs, thereby facilitating further densification.

Final "step" (g) involves repeating steps (d) through (f) until the density of the carbon-carbon composite preform is at least 1.70 g/cc. In a first iteration of step (d), for instance, the carbon-carbon composite brake disc preform may be densified with an isotropic pitch to a density of approximately 1.3-1.6 grams per cubic centimeter. In a third iteration of step (d), for instance, the carbon-carbon composite brake disc preform is densified with coal tar pitch to a density of approximately 1.75 grams per cubic centimeter. Persons skilled in the art will readily identify the number of iterations of VPI (and optionally RTM) processing with low to medium char-yield pitch that will be appropriate to reach target densities in the carbon-carbon composite brake discs being manufactured.

Another embodiment of the present invention is a method for the manufacture of pitch-densified carbon-carbon composite brake discs from carbon fiber preforms, which method comprises sequentially: (a) providing a carbon-carbon composite preform in the shape of a brake disc; (b) heat treating said preform at 1600-2540° C.; (c) subjecting the heat-treated preform to CVD/CVI processing; (d) infiltrating the preform with an isotropic low to medium char-yield pitch, employing Vacuum Pitch Infiltration processing or Resin Transfer Molding processing; (e) carbonizing the pitch-infiltrated preform at 900-2400° C.; (f) machining the surfaces of the resulting carbonized preform; and (g) repeating steps (d) through (f) until the density of the carbon-carbon composite preform is at least 1.70 g/cc, provided that in at least one iteration of step (d), the isotropic low to medium char-yield pitch is replaced by a mesophase pitch with a high char yield. In a further variation of this embodiment, at least one iteration of step (d) employs Resin Transfer Molding processing.

By its utilization of the above-described material choices and processing sequences, the present invention thereby avoids variation in the friction and wear performance of the brake discs and improves their strength, oxidation resistance, etc. This invention also improves the economics of disc manufacture. Various "modules" that may be used in accordance with the present invention are summarized below.

Heat Treatment

Intermediate and/or final heat treatment of the preforms is usually applied to modify the crystal structure and order of the carbon. Heat treatment is employed to modify the mechanical, thermal, and chemical properties of the carbon in the preform. Heat treatment of the preforms may be conducted in the range of 1600° to 2450° C. The effect of such a treatment on graphitizable materials is well known. Higher temperatures increase the degree of order in the material, as measured by such analytical techniques as X-ray diffraction or Raman spectroscopy. Higher temperatures also increase the thermal conductivity of the carbon in the products, as well as the elastic modulus.

CVD/CVI

Chemical vapor deposition (CVD) of carbon is also known as chemical vapor infiltration (CVI). In a CVD/CVI process, carbonized, and optionally heat treated, preforms are heated in a retort under the cover of inert gas, typically at a pressure below 100 torr. When the parts reach a temperature of 900° to 1200° C., the inert gas is replaced with a carbon-bearing gas such as methane, ethane, propane, butane, propylene, or acetylene, or combinations of these gases. When the hydrocarbon gas mixture flows around and through the porous structures, a complex set of dehydrogenation, condensation, and polymerization reactions occur, thereby depositing the carbon atoms within the interior and onto the surface of the porous structures. Over time, as more and more of the carbon atoms are deposited onto the structures, the porous structures become more dense. This process is sometimes referred to as densification, because the open spaces in the porous structures are eventually filled with a carbon matrix until generally solid carbon parts are formed. Depending upon the pressure, temperature, and gas composition, the crystallographic structure and order of the deposited carbon can be controlled, yielding anything from an isotropic carbon to a highly anisotropic, ordered carbon. US 2006/0046059 A1 (Arico et al.), the disclosure of which is incorporated herein by reference, provides an overview of CVD/CVI processing.

VPI

Vacuum Pressure Infiltration ("VPI") is a well known method for impregnating a resin or pitch into a preform. The preform is heated under inert conditions to well above the melting point of the impregnating pitch. Then, the gas in the pores is removed by evacuating the preform. Finally, molten pitch is allowed to infiltrate the part, as the overall pressure is returned to one atmosphere or above. In the VPI process a volume of resin or pitch is melted in one vessel while the porous preforms are contained in a second vessel under vacuum. The molten resin or pitch is transferred from vessel one into the porous preforms contained in the second vessel using a combination of vacuum and pressure. The VPI process typically employs resin and pitches which possess low to medium viscosity. Such pitches provide lower carbon yields than do mesophase pitches. Accordingly, at least one additional cycle of pitch infiltration of low or medium char-yield pitch (with VPI or RTM processing) is usually required to achieve a final density of 1.7 g/cc or higher.

Carbonization

The carbonization process is generally well known to those skilled in the art. The CVD/resin/pitch-infiltrated fiber preforms are heated in a retort under inert or reducing conditions to remove the non-carbon constituents (hydrogen, nitrogen, oxygen, etc.) from the fibers and matrix carbons. This process may be performed, for instance, by burying the foam preforms in a bed of activated carbon, enclosed in a superalloy retort with a sand seal. Carbonization of the infiltrated pitch can be carried out either in a furnace, a hot isostatic press, an autoclave, or in a uniaxial hot press. In each of these techniques, the impregnated part is heated to the range of 600° to about 1000° C., while maintaining an inert atmosphere in the pressure range of 1 to 1000 atmospheres. In one approach, for instance, the retort is purged gently with nitrogen for approximately 1 hour, then it is heated to 900° C. in 10-20 hours, and thence to 1050° C. in 1-2 hours. The retort is held at 1050° C.

for 3-6 hours, then allowed to cool overnight. Carbonization can be carried out up to 1800° C. The higher the pressure, the higher the carbon yield achieved, although the biggest gains in carbon yield are achieved at moderate pressures up to 5000 psi.

Machining the Surfaces of the Preform

Standard machining processes, well known to persons skilled in the art of manufacturing carbon-carbon composite brake discs, are used in the manufacture of the carbon-carbon composite friction discs provided by the present invention. Between densification processing steps, the surfaces of the annular discs are ground down to expose porosity in the surfaces. Once the final density is achieved, the annular discs are ground to their final thickness using standard grinding equipment to obtain parallel flat surfaces, and then the inside diameter and outside diameter regions are machined, typically using a CNC (computer numerical control) Mill to provide the final geometry including such features as rivet holes and drive lugs.

EXAMPLES

The following non-limiting examples illustrate various options for implementing the novel manufacturing method provided by the present invention.

| Preform | CVD Infiltration | Pitch Infiltration 1 | Stabilization | Pitch Infiltration 2 | Pitch Infiltration 3 |
|---|---|---|---|---|---|
| Nonwoven carbon fiber | Rough Laminar | VPI - Isotropic- Medium char yield | YES | VPI - Isotropic- Medium char yield | VPI - Isotropic- Medium char yield |
| Nonwoven carbon fiber | Rough Laminar | VPI - Isotropic- Medium char yield | NO | RTM - Mesophase- High Char yield | VPI - Isotropic- Medium char yield |
| Nonwoven carbon fiber | Smooth Laminar | VPI - Isotropic- Medium char yield | NO | VPI - Mesophase High Char yield | RTM - Isotropic medium char yield |
| Nonwoven carbon fiber | Smooth Laminar | RTM - Isotropic- Medium char yield | YES | VPI - Mesophase- high char yield | VPI - Isotropic Medium char yield |
| Nonwoven carbon fiber | Isotropic | VPI - Isotropic- Medium char yield | YES | VPI - Isotropic Medium char yield | VPI - Mesophase- high char yield |
| Nonwoven carbon fiber | Isotropic | RTM - Isotropic- Medium char yield | YES | VPI - Mesophase- high char yield | VPI - Isotropic Medium char yield |

INDUSTRIAL APPLICABILITY

In terms of friction and wear performance, densifying a carbon composite preform using multiple cycles of CVD results in uniform carbon matrix microstructures throughout the thickness of the composite. This uniform microstructure comes at a cost, due to the high capitalization costs for CVD furnaces. In the present invention, only a single CVD cycle is used to reproduce a uniform microstructure at the fiber matrix interfaces throughout the thickness of the composite. No subsequent CVD/CVI densification cycles are necessary. In place of subsequent CVD cycles, in this invention the carbon composite preform is further densified with low to medium char-yield isotropic pitch, using VPI or RTM equipment, to provide a more economical method of achieving a final density of 1.7 g/cc or higher.

In terms of manufacturing economics, the hybrid composite concept (CVD and pitch matrices) embodied in the present invention enables the use of low cost pitch materials combined with low cost capitalization for processing equipment (VPI and RTM) which produces carbon friction materials with consistent properties and friction and wear performance.

The present invention has been described herein in terms of illustrative embodiments. Modifications and additions to these embodiments will be apparent to those skilled in the art upon a reading of the foregoing description. All such modifications and additions form a part of the present invention to the extent they fall within the scope of the several claims appended hereto.

What is claimed is:

1. A method for the manufacture of pitch-densified carbon-carbon composite brake discs from carbon fiber preforms, the method comprising the following sequential steps:
    (a) providing a carbon-carbon composite preform made from nonwoven carbon fiber fabric, said preform being configured in the shape of a brake disc;
    (b) heat treating said preform at 1600-2540° C.;
    (c) directly following step (b), subjecting the heat-treated preform to Chemical Vapor Deposition/Chemical Vapor Infiltration processing to produce a carbonized fiber preform which: (i.) has a rough laminar microstructure and is densified to a density of about 1.4 grams per cubic centimeter; or (ii.) has a smooth laminar microstructure and is densified to a density of about 1.2 grams per cubic centimeter; or (iii.) has an isotropic microstructure and is densified to a density of about 1.1 grams per cubic centimeter;
    (d) infiltrating the preform with an isotropic low to medium char-yield pitch derived from coal tar, employing Vacuum Pitch Infiltration processing;
    (e) stabilizing the pitch-infiltrated preform by heating it in air at about 180° C. and then carbonizing the pitch-infiltrated preform at 900-2400° C.;
    (f) machining the surfaces of the resulting carbonized preform; and
    (g) repeating steps (d) through (f) at least two additional times, to raise the density of the carbon-carbon composite preform to at least approximately 1.75 g/cc,
    wherein the carbon-carbon composite brake disc preform is densified with an isotropic coal tar pitch to a density of approximately 1.3-1.6 grams per cubic centimeter in the first implementation of step (d) and
    wherein the carbon-carbon composite brake disc is densified with coal tar pitch to a density of at least approximately 1.75 grams per cubic centimeter in the third implementation of step (d).

2. The method of claim 1, wherein step (e) is directly followed by a step comprising heat treating the carbonized preform at 1600-2400° C., with a 4 hour hold, to further graphitize the pitch matrix.

3. The method of claim 1, where the isotropic pitch used in step (d) is a low to medium char-yield material derived from coal tar.

4. The method of claim 1, wherein the carbonized fiber preform produced in CVD/CVI densification step (c): (i.) has a rough laminar microstructure and is densified at a temperature of 1275° C., a pressure of 210 Torr, and a C/H ratio of 1/4; (ii.) has a smooth laminar microstructure and is densified at a temperature of 1200° C., a pressure of 630 Torr, and a C/H ratio of 1/4; or (iii.) has an isotropic microstructure and is densified at a temperature of 1425° C., a pressure of 630 Torr, and a C/H ratio of 1/4.

5. The method of claim 1, wherein carbonization step (e) is carried out at a temperature between about 1200 and 2000° C. in an inert nitrogen atmosphere or in a vacuum.

6. A method for the manufacture of pitch-densified carbon-carbon composite brake discs from carbon preforms, the method comprising the following sequential steps:
- (a) providing a carbon-carbon composite preform made from nonwoven carbon fiber fabric, said preform being configured in the shape of a brake disc;
- (b) heat treating said preform at 1600-2540° C.;
- (c) directly following heat treating step (b), subjecting the heat-treated preform to Chemical Vapor Deposition/Chemical Vapor Infiltration processing to produce a carbonized fiber preform which; (i.) has a rough laminar microstructure and is densified to a density of about 1.4 grams per cubic centimeter; or (ii.) has a smooth laminar microstructure and is densified to a density of about 1.2 grams per cubic centimeter, or (iii.) has an isotropic microstructure and is densified to a density of about 1.1 grams per cubic centimeter;
- (d) infiltrating the preform with an isotropic low to medium char-yield pitch derived from coal tar, employing Vacuum Pitch Infiltration processing;
- (e) conducting oxidative stabilization at a temperature between about 150 and 250° C. to prevent pitch exudation and then carbonizing the pitch-infiltrated preform at 900-2400° C.;
- (f) machining the surfaces of the resulting carbonized preform; and
- (g) repeating steps (d) through (f) at least two additional times, to raise the density of the carbon-carbon composite preform to at least approximately 1.75 g/cc, wherein the carbon-carbon composite brake disc preform is densified with an isotropic coal tar pitch to a density of approximately 1.3-1.6 grams per cubic centimeter in the first implementation of step (d) and wherein the carbon-carbon composite brake disc preform is densified with coal tar pitch to a density of at least approximately 1.75 grams per cubic centimeter in the third implementation of step (d).

* * * * *

UNITED STATES PATENT AND TRADEMARK OFFICE
CERTIFICATE OF CORRECTION

PATENT NO. : 7,938,992 B2  
APPLICATION NO. : 12/036881  
DATED : May 10, 2011  
INVENTOR(S) : Mark L. La Forest et al.

Page 1 of 1

It is certified that error appears in the above-identified patent and that said Letters Patent is hereby corrected as shown below:

Col. 6, Line 26 (Claim 1), "directly following step" should be --directly following heat treating step--

Col. 6, Line 45 (Claim 1), "times, to raise the" should be --times to raise the--

Col. 8, Line 11 (Claim 6), "times, to raise the" should be --times to raise the--

Signed and Sealed this
Twelfth Day of February, 2013

Teresa Stanek Rea
*Acting Director of the United States Patent and Trademark Office*